United States Patent [19]

Ishizuka et al.

[11] Patent Number: 5,410,238
[45] Date of Patent: Apr. 25, 1995

[54] RAPID BATTERY CHARGER WITH SLOW CHARGE MODE AT A LOW TEMPERATURE

[75] Inventors: Takahito Ishizuka; Shigeru Shinohara, both of Katsuta, Japan

[73] Assignee: Hitachi Koki Co., Ltd., Tokyo, Japan

[21] Appl. No.: 971,579

[22] Filed: Nov. 5, 1992

Related U.S. Application Data

[63] Continuation-in-part of Ser. No. 729,307, Jul. 12, 1991, abandoned.

[30] Foreign Application Priority Data

Jul. 13, 1990 [JP] Japan .................................. 2-186764

[51] Int. Cl.⁶ .............................................. H02J 7/00
[52] U.S. Cl. .............................................. 320/22; 320/35
[58] Field of Search ...................... 320/22, 23, 24, 35, 320/36

[56] References Cited

U.S. PATENT DOCUMENTS

| | | | |
|---|---|---|---|
| 3,917,990 | 11/1975 | Sherman, Jr. | 320/35 |
| 4,308,493 | 12/1981 | Köthe et al. | 320/35 |
| 4,649,333 | 3/1987 | Moore | 320/35 X |
| 4,670,703 | 6/1987 | Williams | 320/22 |
| 4,712,055 | 12/1987 | Houser, Jr. | 320/35 |

FOREIGN PATENT DOCUMENTS 60-2353  1/1985  Japan .

*Primary Examiner*—Kristine L. Peckman
*Attorney, Agent, or Firm*—Sughrue, Mion, Zinn, Macpeak & Seas

[57] ABSTRACT

To enable recharging of a battery under a low temperature circumstance, a rapid battery charger is provided with a rapid charge mode and a slow charge mode which are selectively used depending upon the temperature of the battery. The rapid charge mode is selected when the temperature is above a predetermined value, wherein the battery charger charges the battery with a charging current of more than 5 C, whereas the slow charge mode is selected when the temperature is below the predetermined value, wherein the battery charger charges the battery with a charging current of less than 1 C.

24 Claims, 3 Drawing Sheets

RAPID BATTERY CHARGER WITH SLOW CHARGE MODE AT A LOW TEMPERATURE

CROSS-REFERENCE TO RELATED APPLICATION

This application is a continuation-in-part application of a Ser. No. 07/729,307 filed Jul. 12, 1991 now abandoned.

BACKGROUND OF THE INVENTION

The present invention relates generally to rapid battery chargers, and more particularly to a rapid battery charger having a charge rate of more than 5 C where C is a battery charging rate and represents a charging current required for charging a battery in an hour.

Recently, battery-driven cordless products which do not require a power supply cord have been extensively used in various fields. In the field of electrically-driven machine tools, cordless machine tools have become extensively used. Such cordless machine tools typically use a nickel-cadmium battery as a power source battery whose internal resistance is so small that a large amount of current can be supplied therefrom and whose service-life is relatively long under the repetitive charges and discharges.

To perform a rapid charge of the battery, a battery charger having a charge rate of 1 C has been of a major use. Recently, the battery charger having a charge rate of 5 C has recently been on sale.

However, the service life of the nickel-cadmium battery tends to be extremely shortened when the battery is quickly charged under a low temperature circumstance, say, less than 0° C. Because an electrolyte is liable to leak out of the battery and an insulating material used in the battery is liable to be damaged due to an abrupt increase of an inner gas pressure of the battery. For such reasons, consumers are warned not to perform quick charge of the nickel-cadmium batteries in the low temperature circumstance. This means incapability of using the battery-driven devices under such a circumstance.

SUMMARY OF THE INVENTION

The present invention has been made to solve the afore-mentioned problems accompanying the conventional battery chargers, and accordingly it is an object of the present invention to provide a battery charger which can charge the battery even in a low temperature circumstance without destroying the battery.

To achieve the above and other objects, there is provided, in accordance with one aspect of the invention, a battery charger for charging a battery, which includes power source means, temperature sensing means, and control means. The power source means generates a charging voltage at its output to charge the battery with a charging current. The temperature sensing means senses the temperature of the battery and produces a first detection signal or a second detection signal. The first detection signal is produced when the temperature sensed is above a predetermined value. The second detection signal is produced when the temperature sensed is below the predetermined value. The predetermined value is determined independent of the ambient temperature. The control means is connected to the power source means for controlling the output of the power source means. In response to the first detection signal, the control means controls the power source means to flow the charging current in the battery so that the battery is charged in a rapid charge mode. In response to the second detection signal, the control means controls the power source means to flow the charging current in the battery so as to charge the battery in a slow charge mode slower in charging rate than the rapid charge mode.

In accordance with another aspect of the invention, the battery is firstly charged in the slow charge mode and then in the rapid charge mode. The predetermined value which is a critical value for selecting one of the slow and rapid charge modes has been set above the temperature of the battery. The second detection signal is firstly produced from the sensing means. In response thereto, the control means controls the power source means to flow the charging current in the battery so that the battery is charged in the slow charge mode. Thereafter, the first detection signal is produced attendant to a temperature increase of the battery during the charging in the slow charge mode. In response to the first detection signal, the control means controls the power source means to flow the charging current in the battery so as to charge the battery in the rapid charge mode faster in charging rate than the slow charge mode.

In the rapid charge mode, the charging current is larger than 5 C where C represents a charging current required for charging a battery in an hour, and in the slow charge mode, the charging current is equal to or less than 1 C.

The above and other objects, features and advantages of the present invention will become more apparent from the following description when taken in conjunction with the accompanying drawings in which preferred embodiments of the present invention are shown by way of illustrative examples.

DETAILED DESCRIPTION OF THE PREFERRED EMBODIMENTS

A first embodiment of the present invention will be described with reference to FIGS. 1 and 2.

Figure 1:
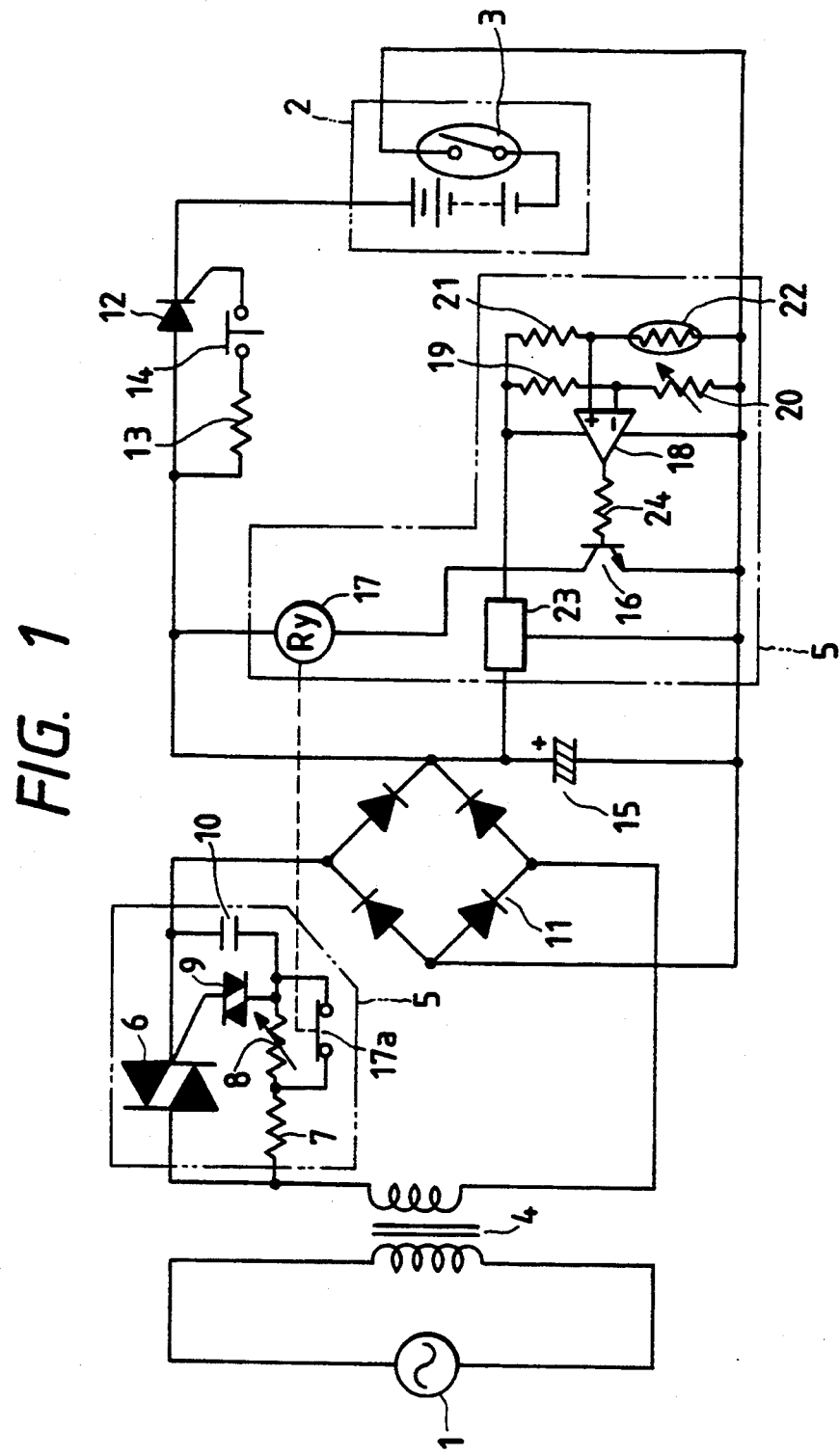
FIG. 1 is a circuit diagram showing a rapid battery charger according to one embodiment of the present invention.
Figure 2:
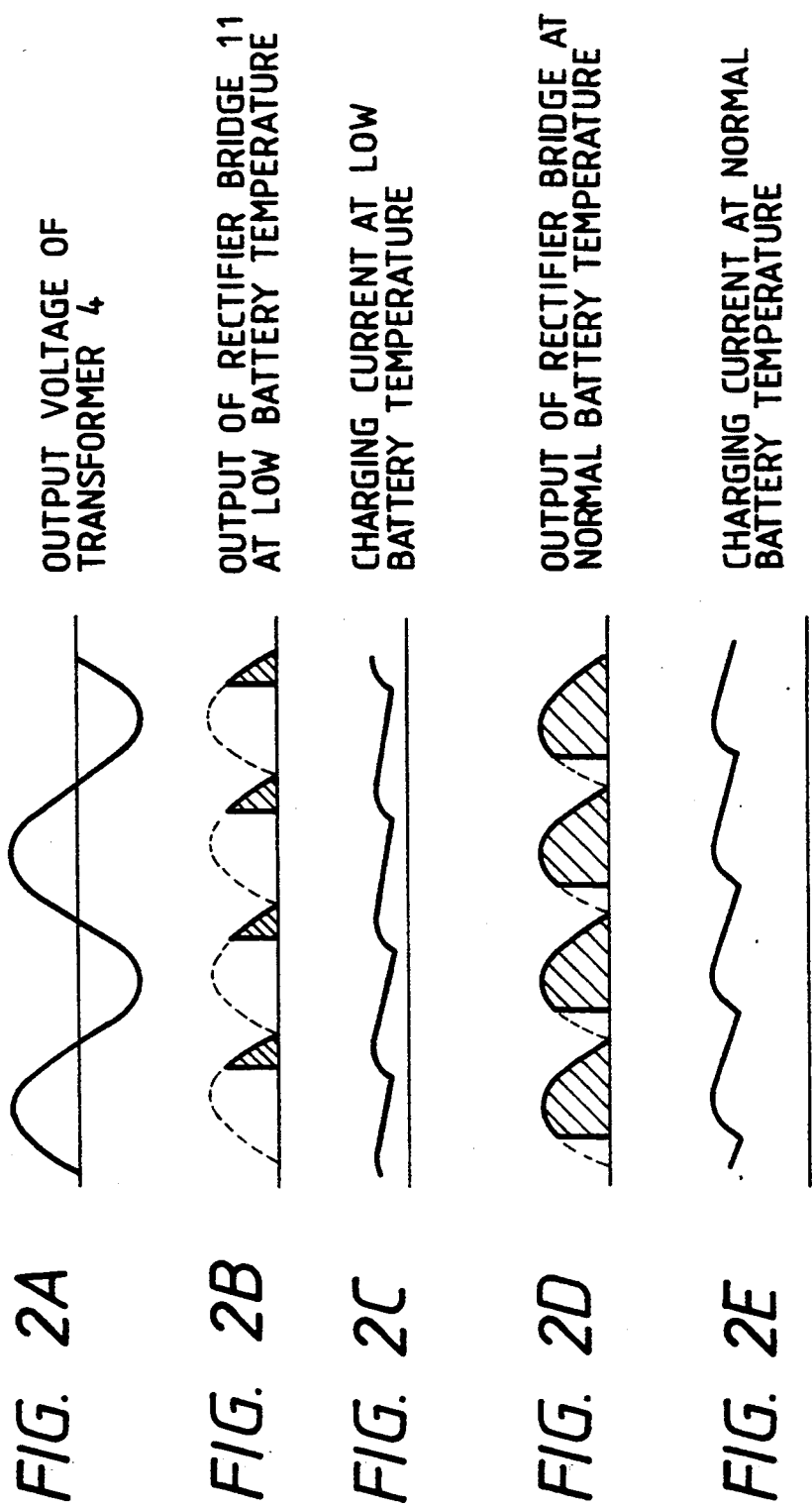
FIGS. 2A through 2E are waveform diagrams for description of the operation of the circuit shown in FIG. 1.

A rapid battery charger shown in FIG. 1 includes an insulation transformer 4 having a primary winding connected to an AC power source 1 and a secondary winding connected to a rectifier bridge 11 through a voltage control circuit 5. The output of the rectifier bridge 11 is connected to a capacitor 15 across which a nickel-cadmium (Ni-Cd) battery 2 is connected through a start switch circuit. A thermostat 3 is thermally coupled to a nickel-cadmium (Ni-Cd) battery 2 to sense the temperature thereof.

The voltage control circuit 5 includes a bi-directional thyristor 6 known as a TRIAC (Triode AC Semiconductor switch), a resistor 7, a variable resistor 8, a capacitor 10, a bi-directional diode thyristor 9 known as a BIAC, a normally-closed relay contact 17a, a transistor 16, a relay coil 17, a comparator 18, resistors 19 through 21, a thermistor 22, and a three-terminal regulator 23.

The relay contact 17a is connected across the variable resistor 8, and a series connection of the resistors 7, 8 and the capacitor 10 is connected across the TRIAC 6. The BIAC 9 is connected between the gate of the TRIAC 6 and the contact between the resistor 8 and the capacitor 10.

The three-terminal regulator 23 is provided to generate a constant voltage for driving the comparator 18 and developing a voltage across each of the resistors 19 through 21 and the thermistor 22. The comparator 18 has an inverting input terminal to which applied is a reference voltage developed across the variable resistor 20, and a non-inverting input terminal to which applied is a detection voltage developed across the thermistor 22 which detection voltage corresponds to a battery temperature or an ambient temperature. Upon comparison of the detection voltage with the reference voltage, the comparator 18 outputs either a high-level or a low-level output signal.

More specifically, the resistances of the elements 19 through 22 have been determined so that when the battery temperature is equal to or lower than 0° C. at which time the detection voltage is greater than the reference voltage, the comparator 18 outputs the high-level signal, whereas when the battery temperature is higher than 0° C. at which time the detection voltage is less than the reference voltage, the comparator 18 outputs the low-level signal. The output of the comparator 18 is connected through the resistor 24 to the base of the transistor 16 which in turn is connected to the relay coil 17.

The start switch circuit includes a thyristor 12, a resistor 13 and a start switch 14.

In operation, when an AC power source 1 is connected across the primary winding of the transformer 4, the AC voltage developed across the secondary winding of the transformer 4 is applied to the TRIAC 6. The output voltage of the TRIAC 6 is applied through the rectifier bridge 11 to the capacitor 15. By connecting the battery 2 and closing the start switch 14, a gate current flows in the thyristor 12 so that the latter is rendered conductive. The battery 2 then starts charging. As the charging proceeds and when the battery 2 is placed in substantially fully charged state, the battery 2 is abruptly raised to a high temperature. In response to the temperature rise of the battery 2, the contact of the thermostat 3 is opened, thereby interrupting the charging current. The thyristor 12 is in turn rendered nonconductive and thus the charging operation is ceased.

The control circuit 5 controls the output voltage of the rectifier bridge 11 depending upon the temperature sensed by the thermistor 22. Specifically, when the battery temperature is above a predetermined value, say 0° C., the control circuit 5 controls the output voltage of the rectifier bridge 11 to generate a voltage for charging the battery 2 in a rapid charge mode. When the battery temperature is below 0° C., the control circuit 5 controls the output voltage of the rectifier bridge 11 to generate a voltage for charging the battery 2 in a slow charge mode slower in charging rate than the rapid charge mode. The expression of the "slow charge mode" as herein used is intended to mean a charging mode to proceed the charging of the battery at a slow rate to bring the battery in a fully charged condition by increasing the charges of the battery, rather than maintaining the battery in the fully charged condition.

The control circuit 5 controls the output voltage of the rectifying bridge 11 by varying a firing angle of the TRIAC 6. The firing angle of the TRIAC 6 is determined by the time constant of the combination of the resistor 7 and the capacitor 10 or the combination of the resistor 7, the variable resistor 8 and the capacitor 10. The firing angle of the TRIAC 6 is further determined by the break-over voltage of the BIAC 9. When the relay contact 17a is in open state, the time constant is determined by the series connection of the resistor 7 and the variable resistor 8 and the capacitor 10. On the other hand, when the relay contact 17a is in closed state, the time constant is determined by the resistor 7 and the capacitor 10.

When the temperature of the battery 2 is above 0° C., the battery 2 is charged in the rapid charge mode in which the charging current is larger than 5 C where C is a battery capacity in ampere-hours. In the rapid charge mode, the output of the comparator 18 is at low level, so that the transistor 16 is non-conductive. The relay coil 17 is not energized and thus the relay contact 17a is held in closed state, with the result that the variable resistor 8 is short-circuited. The firing angle of the TRIAC 6 is therefore determined depending upon the time constant of the resistor 7 and the capacitor 10. The output waveform of the rectifier bridge 11 in the rapid charge mode is shown in FIG. 2D. As shown, due to the advancement of the firing angle, a large charging current of more than 5 C flows in the battery 2 as shown in FIG. 2E.

On the other hand, when the temperature of the battery 2 is below 0° C., the battery is charged in the slow charge mode in which the charging current is equal to or less than 1 C. In the slow charge mode, the output of the comparator 18 is at a high level, so that the transistor 16 is rendered conductive. The relay coil 17 is therefore energized and the relay contact 17a is opened. At this time, the firing angle of the TRIAC 6 is determined depending upon the time constant of the resistor 7, the variable resistor 8 and the capacitor 10. The output waveform of the rectifier bridge 11 in the slow charge mode is shown in FIG. 2B. Due to the retard of the firing angle, the charging current is reduced to less than 1 C as shown in FIG. 2C.

As described, the rapid charging of the battery is not performed in the low temperature circumstance, yet enabling to charge the battery in the slow charge mode without destroying the battery.

Figure 3:
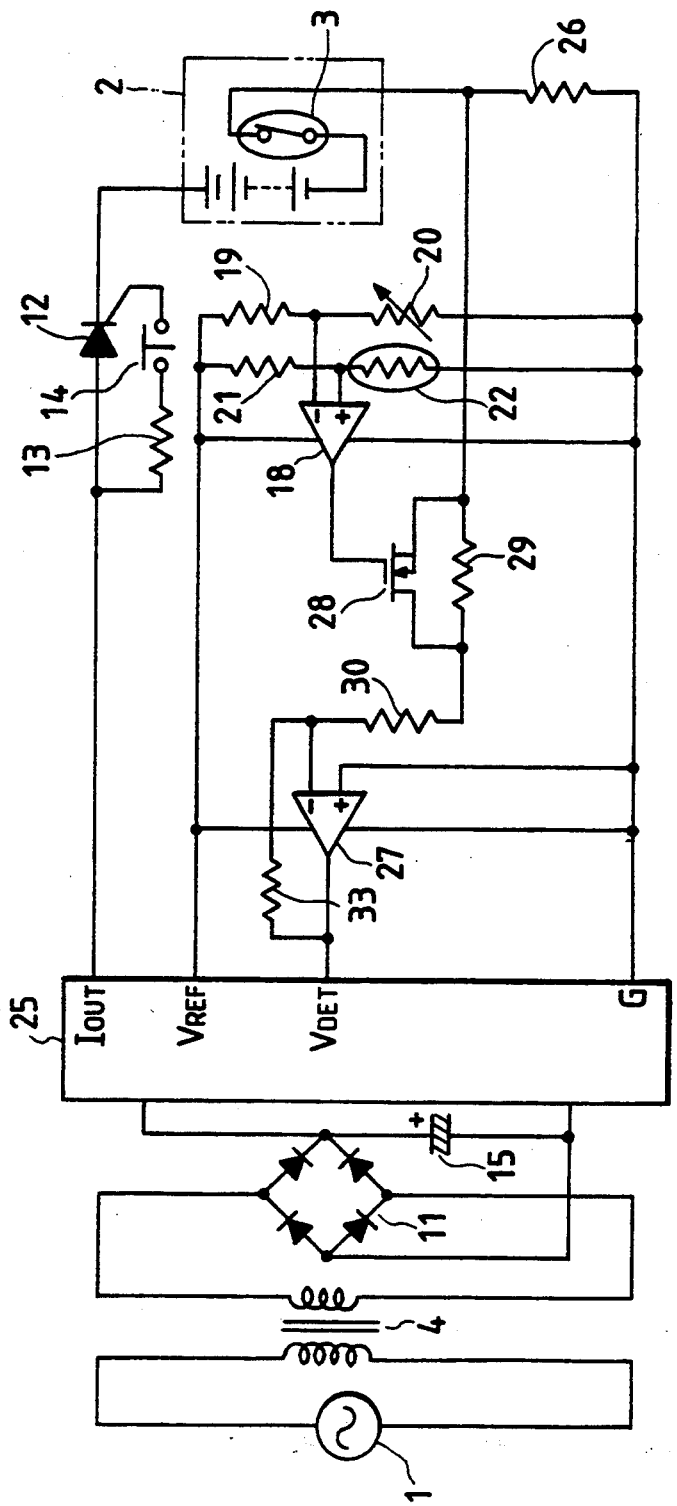
FIG. 3 is a circuit diagram showing a rapid battery charger according to another embodiment of the present invention.

FIG. 3 shows another embodiment of the present invention, where like reference numerals denote like components or elements as previously described.

In the embodiment shown in FIG. 3, a feedback type constant current supplying unit 25 is employed in place of the control circuit 5. The unit 25 has an output terminal ($I_{OUT}$) and a detection input terminal ($V_{DET}$), wherein a constant charging current is supplied from the output terminal ($I_{OUT}$) depending upon the voltage fed back to the detection input terminal ($V_{DET}$), which voltage corresponds to the charging current flowing in the battery 2.

An operational amplifier 27 is connected between the output of the operational amplifier 18 and the detection input terminal ($V_{DET}$) of the unit 25. Resistors 29, 30 and 33 are provided in association with the operational amplifier 27, which determine an amplification factor of the operational amplifier. An FET 28 is connected to short-circuit the resistor 29 when it is conductive. Specifically, the gate of the FET 28 is connected to the output of the operational amplifier 18 and the resistor 29 is connected between the drain and source of the FET 28. A shunt resistor 26 is provided to detect the charging current.

With the shunt resistor 26, the charging current is detected and is fed back through the operational amplifier 27 to the detection input ($V_{DET}$) of the constant current supplying unit 25.

In the slow charge mode performed at the time when the temperature of the battery 2 is below 0° C., the output of the comparator 18 is at a high level and thus the gate of the FET 28 is applied with a high voltage to render it conductive. As a result, the resistor 29 is short-circuited and thus the amplification factor of the operational amplifier 27 is increased to a value represented by a ratio of the resistances of the resistors 33 and 30, i.e., $R_{33}/R_{30}$ where $R_{33}$ and $R_{30}$ are the resistances of the resistors 33 and 30, respectively. Since a high voltage is applied to the detection input terminal ($V_{DET}$) of the constant current supplying unit 25, the latter supplies a reduced amount of the charging current from the output terminal ($I_{OUT}$). The circuit is configured so that the charging current of less than 1 C is supplied from the output terminal ($I_{OUT}$) when the temperature of the battery 2 is below 0°.

On the other hand, at the rapid charge mode at the time when the temperature of the battery 2 is above 0° C., the FET 28 is non-conductive and the amplification factor of the operational amplifier 27 is decreased as it is determined by the resistances of the resistors 33, 30 and 29. That is, the amplification factor of the operational amplifier 27 in this instance is determined by $R_{33}/R_{30}+R_{29}$ where $R_{29}$ is the resistance of the resistor 29, so that a low voltage is applied to the detection input terminal ($V_{DET}$) of the constant current supplying unit 25. The unit 25 supplies an increased amount of the charging current to the battery 2 from the output terminal ($I_{OUT}$). The circuit is configured so that the charging current of more than 5 C is supplied from the output terminal ($I_{OUT}$) when the temperature of the battery 2 is above 0°.

Meanwhile, the unit 25 provides a constant voltage at its $V_{REF}$ terminal, which constant voltage is used to drive the operational amplifiers 18 and 27.

In the embodiments described above, the rapid charge and the slow charge are selectively performed depending purely on the temperature of the battery. For the batteries having such characteristics that the temperature of the battery increases as the charging proceeds, the battery is initially charged in the slow charge mode, and attendant to the temperature rise of the battery during the charging in the slow charge mode, the battery is subsequently charged in the rapid charge mode.

While the present invention has been described with reference to specific embodiments, those skilled in the art will recognize that there are many possible modifications and variations which may be made in this exemplary embodiments while yet retaining many of the novel features and advantages of the invention. For example, although the Ni-Cd battery has been shown and described as a rechargeable battery to be charged by the battery charger of the present invention, other kinds of rechargeable batteries are usable. Further, the slow charge mode has been described in relation to a specific temperature of the battery, the temperature thereof to perform the slow charge mode may arbitrarily be set depending upon the characteristic of the battery in use. Furthermore, while in the foregoing description, either of the rapid and slow charge modes is selected in response to the temperature of the battery, this can be done by sensing ambient temperature under a situation where the battery temperature and the ambient temperature are considered to be substantially equal to each other.

What is claimed is:

1. A battery charger for charging a battery, comprising:

power source means for generating a charging voltage at its output to charge the battery with a charging current;

temperature sensing means for sensing a temperature representative substantially of a temperature of the battery, said temperature sensing means producing a first detection signal when the temperature is above a predetermined value and a second detection signal when the temperature is below the predetermined value, said predetermined value being independent of the ambient temperature; and control means connected to said power source means for controlling the output of said power source means, wherein in response to the first detection signal, said control means controls said power source means to flow the charging current in the battery so that the battery is charged in a rapid charge mode and wherein in response to the second detection signal, said control means controls said power source means to flow the charging current in the battery so as to charge the battery in a slow charge mode slower in charging rate than the rapid charge mode, the battery being charged in said slow charge mode for all temperatures below said predetermined value.

2. A battery charger according to claim 1, wherein in the rapid charge mode, the charging current is larger than 5 C where C represents a charging current required for charging the battery in an hour, and in the slow charge mode, the charging current is equal to or less than 1 C.

3. A battery charger according to claim 1, wherein said control means comprises a gate-controlled switching device having a gate applied with trigger signals, each trigger signal being produced at a time determined by each of the first and second detection signals, said switching device being turned on for a duration determined by the time when the trigger signal is produced.

4. A battery charger according to claim 3, wherein said control means further comprises a first combination of a capacitor and a resistor, said first combination giving a first time constant for determining the time when the trigger signal in association with the first detection signal is produced, and a second combination of a capacitor and a resistor, said second combination giving a second time constant for determining the time when the trigger signal in association with the second detection signal is produced.

5. A battery charger according to claim 1, wherein said control means comprises constant current supplying means having a detection terminal and an output terminal, said constant current supplying means supplying from the output terminal the charging current whose level is determined depending upon a voltage applied to the detection terminal, and a voltage applying means connected to said temperature sensing means for applying the voltage to the detection terminal of said constant current supplying means, said voltage applying means applies a first voltage when the first detection signal is produced from said temperature sensing means and a second voltage when the second detection signal is produced from said temperature sensing means, whereby the level of the charging current can be changed depending upon the temperature of the battery.

6. A battery charger according to claim 5, wherein said voltage applying means comprises a voltage amplifying means whose amplification factor is changed depending upon each of the first and second detection signals.

7. A battery charger according to claim 2, wherein said control means comprises a gate-controlled switching device having a gate applied with trigger signals, each trigger signal being produced at a time determined by each of the first and second detection signals, said switching device being turned on for a duration determined by the time when the trigger signal is produced.

8. A battery charger according to claim 7, wherein said control means further comprises a first combination of a capacitor and a resistor, said first combination giving a first time constant for determining the time when the trigger signal in association with the first detection signal is produced, and a second combination of a capacitor and a resistor, said second combination giving a second time constant for determining the time when the trigger signal in association with the second detection signal is produced.

9. A battery charger according to claim 2, wherein said control means comprises constant current supplying means having a detection terminal and an output terminal, said constant current supplying means supplying from the output terminal the charging current whose level is determined depending upon a voltage applied to the detection terminal, and a voltage applying means connected to said temperature sensing means for applying the voltage to the detection terminal of said constant current supplying means, said voltage applying means applies a first voltage when the first detection signal is produced from said temperature sensing means and a second voltage when the second detection signal is produced from said temperature sensing means, whereby the level of the charging current can be changed depending upon the temperature of the battery.

10. A battery charger according to claim 9, wherein said voltage applying means comprises a voltage amplifying means whose amplification factor is changed depending upon each of the first and second detection signals.

11. A battery charger according to claim 1, wherein the battery is a nickel-cadmium battery.

12. A battery charger for charging a battery, comprising:
    power source means for generating a charging voltage at its output to charge the battery with a charging current;
    battery temperature sensing means for sensing a temperature representative substantially of the battery, said temperature sensing means producing a first detection signal when the temperature is above a predetermined value and a second detection signal when the temperature is below the predetermined value, said predetermined value being independent of the ambient temperature; and
    control means connected to said power source means for controlling the output of said power source means, wherein in response to the second detection signal, said control means controls said power source means to flow the charging current in the battery so that the battery is charged in a slow charge mode and wherein in response to the first detection signal produced attendant to a temperature increase of the battery during the charging in the slow charge mode, said control means controls said power source means to flow the charging current in the battery so as to charge the battery in a rapid charge mode faster in charging rate than the slow charge mode, the battery being charged in said slow charge mode for all temperatures below said predetermined value.

13. A battery charger according to claim 12, wherein in the rapid charge mode, the charging current is larger than 5 C where C represents a charging current required for charging the battery in an hour, and in the slow charge mode, the charging current is equal to or less than 1 C.

14. A battery charger according to claim 12, wherein said control means comprises a gate-controlled switching device having a gate applied with trigger signals, each trigger signal being produced at a time determined by each of the first and second detection signals, said switching device being turned on for a duration determined by the time when the trigger signal is produced.

15. A battery charger according to claim 14, wherein said control means further comprises a first combination of a capacitor and a resistor, said first combination giving a first time constant for determining the time when the trigger signal in association with the first detection signal is produced, and a second combination of a capacitor and a resistor, said second combination giving a second time constant for determining the time when the trigger signal in association with the second detection signal is produced.

16. A battery charger according to claim 12, wherein said control means comprises constant current supplying means having a detection terminal and an output terminal, said constant current supplying means supplying from the output terminal the charging current whose level is determined depending upon a voltage applied to the detection terminal, and a voltage applying means connected to said temperature sensing means for applying the voltage to the detection terminal of said constant current supplying means, said voltage applying means applies a first voltage when the first detection signal is produced from said temperature sensing means and a second voltage when the second detection signal is produced from said temperature sensing means, whereby the level of the charging current can be changed depending upon the temperature of the battery.

17. A battery charger according to claim 16, wherein said voltage applying means comprises a voltage amplifying means whose amplification factor is changed depending upon each of the first and second detection signals.

18. A battery charger according to claim 13, wherein said control means comprises a gate-controlled switching device having a gate applied with trigger signals, each trigger signal being produced at a time determined by each of the first and second detection signals, said switching device being turned on for a duration determined by the time when the trigger signal is produced.

19. A battery charger according to claim 18, wherein said control means further comprises a first combination of a capacitor and a resistor, said first combination giving a first time constant for determining the time when the trigger signal in association with the first detection signal is produced, and a second combination of a capacitor and a resistor, said second combination giving a second time constant for determining the time when the trigger signal in association with the second detection signal is produced.

20. A battery charger according to claim 13, wherein said control means comprises constant current supplying means having a detection terminal and an output terminal, said constant current supplying means supplying from the output terminal the charging current whose level is determined depending upon a voltage applied to the detection terminal, and a voltage applying means connected to said temperature sensing means for applying the voltage to the detection terminal of said constant current supplying means, said voltage applying means applies a first voltage when the first detection signal is produced from said temperature sensing means and a second voltage when the second detection signal is produced from said temperature sensing means, whereby the level of the charging current can be changed depending upon the temperature of the battery.

21. A battery charger according to claim 20, wherein said voltage applying means comprises a voltage amplifying means whose amplification factor is changed depending upon each of the first and second detection signals.

22. A battery charger according to claim 12, wherein the battery is a nickel-cadmium battery.

23. A battery charger according to claim 1, wherein said control means controls said power source means to flow the charging current in one of said rapid charge mode and said slow charge mode based only upon the temperature of the battery.

24. A battery charger according to claim 12, wherein said control means controls said power source means to flow the charging current in one of said rapid charge mode and said slow charge mode based only upon the temperature of the battery.

* * * * *